United States Patent [19]
Theurer et al.

[11] 4,206,992
[45] Jun. 10, 1980

[54] ELECTROMAGNETIC ACTUATOR FOR SHUTTERS FOR PHOTOGRAPHIC CAMERAS

[75] Inventors: Richard Theurer, Höfen; Dieter Rittmann, Calmbach, both of Fed. Rep. of Germany

[73] Assignee: Prontor-Werk Alfred Gauthier GmbH, Wildbad, Fed. Rep. of Germany

[21] Appl. No.: 815,483

[22] Filed: Jul. 14, 1977

Related U.S. Application Data

[63] Continuation of Ser. No. 630,852, Nov. 11, 1975, abandoned, which is a continuation of Ser. No. 509,592, Sep. 26, 1974, abandoned, which is a continuation of Ser. No. 428,260, Dec. 26, 1973, abandoned, which is a continuation of Ser. No. 335,694, Feb. 26, 1973, abandoned, which is a continuation of Ser. No. 131,877, Apr. 7, 1971, abandoned.

[30] Foreign Application Priority Data

Apr. 11, 1970 [DE] Fed. Rep. of Germany ....... 2017467

[51] Int. Cl.² ........................... G03B 7/00; G03B 9/22
[52] U.S. Cl. ...................................... 354/235; 354/264
[58] Field of Search ..................... 354/29, 50, 51, 230, 354/234, 235, 258, 264, 60 R

[56] References Cited

U.S. PATENT DOCUMENTS

| | | | |
|---|---|---|---|
| 3,455,218 | 7/1969 | Eagle et al. | 354/60 R X |
| 3,466,993 | 6/1969 | Fahlerberg et al. | 354/51 |
| 3,492,931 | 2/1970 | Racki | 354/264 |
| 3,498,194 | 3/1970 | Bellows | 354/29 |
| 3,559,547 | 2/1971 | Rentschler | 354/51 |
| 3,696,726 | 10/1972 | Lewis | 354/235 |

*Primary Examiner*—Michael L. Gellner
*Attorney, Agent, or Firm*—Arthur A. March

[57] ABSTRACT

Electromagnetically operated camera shutter includes a pivotally mounted shutter blade actuating ring having a radially directed arm and driven from closed position to open, an electromagnet having an electromagnetically responsive external anchor and mounted for movement from a remote to a proximate position with respect to the electromagnet in response to energization of the electromagnet and disposed to provide a closable gap, and an actuator arm directly interconnecting the anchor with the ring and movable for driving the ring from closed to open position, and with a cylindrical housing arranged to provide an annular space between itself and the ring for disposing the electromagnet and anchor, and with the arm in the form of a curvo-linear actuator arm fixedly carried on the anchor and arranged in the space for acting against the radially directed arm at a displaceable point, and particularly with such actuator arm being of similar curvature to that of the space and sized to permit unhindered movement within the space for driving the ring by impingement against the radially directed arm. The point of engagement between the actuating arm and radially directed arm is constantly displaced in the direction of the ideal pivot axis of the ring in dependence upon the pivotal movement of the anchor to close the gap. It further includes a return spring disposed for driving the ring from open to closed position upon deenergization of the electromagnet.

8 Claims, 2 Drawing Figures

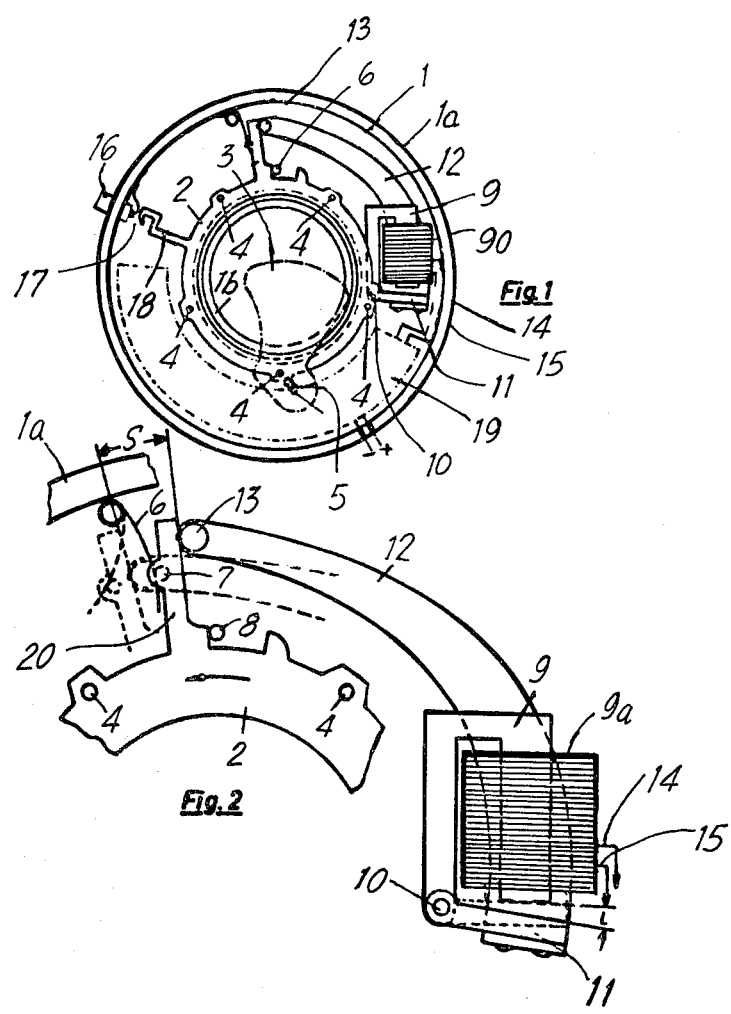

ELECTROMAGNETIC ACTUATOR FOR SHUTTERS FOR PHOTOGRAPHIC CAMERAS

This is a continuation in turn of copending applications: Ser. No. 630,852, filed Nov. 11, 1975; Ser. No. 509,592, filed Sept. 26, 1974; Ser. No. 428,260, filed Dec. 26, 1973; Ser. No. 335,694, filed Feb. 26, 1973; and Ser. No. 131,877, filed Apr. 7, 1971, each of which has been abandoned respectively.

BACKGROUND OF INVENTION

While electromagnetically driven shutters are known in the art they have heretofore been of relatively large dimensions requiring a great deal of space and their use has therefore been limited to magnifying and reproduction devices. Such shutters have not been used in cameras of the amateur and professional standard types for the reason that the size of the housing for such shutter is limited and not adapted to readily accommodate an electromagnet with a capacity ensuring relatively short focusing times as, for example, for 1/100 of a second with the aperture being held within desired and acceptable limits.

Furthermore, a smaller electromagnet adapted to be built into a camera of the aforementioned standard amateur and professional models was not able to perform its desired functions for the reason that not only is it required to act against the mass of segments or blades of the shutter to be accelerated when advancing the anchor and against the return spring tending to close the shutter blades, but in addition it must overcome the frictional stresses which normally occur and bind the connecting links between the anchor and the segment or blade actuator. As a consequence attempts to provide standard or small cameras with an electromagnetic control were not successful.

SUMMARY OF THE INVENTION

It is therefore an object of the present invention to provide an electromagnetic segment actuator which may be used for shutters of standard cameras used in amateur or professional photography.

It is a further object of the present invention to provide an electromagnetic actuator for shutters in cameras whose elements for the application of force are greatly reduced in size and thereby reduce the frictional stresses in the control system while assuring operability.

In accordance with this invention an anchor is secured to a shutter segment or blade actuator and the anchor is within the force field of the electromagnetic control. The anchor is movable rotationally so that any movement of the anchor will consequently cause movement through a force transmitting element of the segment actuator. With this structure the use of the present invention eliminates all previously utilized pivotal connecting links heretofore necessary for transferring the magnetic force to the segment or blade actuator. Thus the force emanating from the movement of the anchor is applied directly to the segment actuator eliminating all frictional influences which heretofore prevented the use of an electromagnetic control with shutters in cameras used for standard professional and amateur photography.

In detail the segment actuator is curvo-linear or ring shaped and is provided at one end with an offset radially directed arm which moves with the force applied by the electromagnetic arrangement. The structure of the present invention is so arranged that it achieves optimum results in connection with the transfer of forces emanating from the electromagnet. The air gap existing between the anchor and the magnet core of the electromagnet causes the offset arm on the segment activator to move towards an ideal and optimum pivot axis. In other words, a larger actuator arm requiring less force for moving the segments is achieved because the force transfer in the initial moving phase by the magnetic field overcomes a relatively large air gap between the magnetic core and the anchor. A movement in the latter stages during which the air gap is decreased does not cause a consequent proportional increase of the propelling force emanating from the electromagnet but instead the movement is slow and steady throughout the entire arc.

One of the advantages of the present invention is the fact that there is a certain freedom of movement in connection with the arrangement of the electromagnet in the interior of the shutter, the actuating device being in curvo-linear or sickle form particularly adapted to the curvature of the annular space within the shutter housing.

BRIEF DESCRIPTION OF DRAWINGS

While the invention is hereinafter described in detail with regard to specific structure and arrangement, it is to be understood that this is merely for clarity's sake and not to limit the nature of the invention which is hereinafter described in conjunction with the following drawings, in which FIG. 1 shows the power train of the electromagnetic driven shutter illustrating only those portions of the structure which are essential for a complete understanding of the invention; and FIG. 2 shows an enlarged partial view of the electromagnetic segment actuator showing the actuating means in both closed and open positions of the shutter.

DESCRIPTION OF PREFERRED EMBODIMENTS

As illustrated in FIG. 1, the shutter housing 1 is formed of a conventional cylindrical shape. There is an exterior wall 1a and an interior lens tube 1b which carries a unitary ring 2 acting on the segments or blades. The segments or blades are pivotally arranged and only one segment 3 is illustrated in dashed and dotted lines. The segments 3 are each in operational engagement with the ring 2, being connected thereto by means of a pin 4. Furthermore, the segments 3, like the segments 3a, are pivotally arranged in a manner not shown to a plate above the capsule formed by a pin-slot connection 5. As illustrated in FIG. 1, the ring 2 has an offset radially directed stationary arm 2a thereon which engages a return compression spring 6 disposed on the shutter housing 1. The spring 6 may, for example, be a leaf spring and normally rests on pin 7 projecting laterally from one side of the offset arm 2a. The spring normally tends to urge the offset arm 2a into the position where a shoulder of the ring 2 engages motion limiting pin 8 and wherein the shutter segments or blades are in closed position.

The power train for moving the ring 2 against the action of the leaf spring 6 to open the segments 3 of the shutter comprises a stationary unitary electromagnet 9 which is disposed in the small space between the ring 2 and the shutter housing 1. A unitary anchor 11 pivotally arranged about a pivot pin or nut 10 is disposed on the electromagnet separately from and independently of the ring 2. A relatively elongate actuator unitary arm 12, preferably curvo-linear in shape to conform to the shape of the housing, is secured at one end to the anchor 11. The other end of the arm is provided with an upstanding offset pin 13 which abuts and acts directly upon the offset arm 2a of the ring 2.

The coil winding 9a of the electromagnet 9 is galvanically connected over circuits 14 and 15 by a standard control switch 19, shown in dotted lines, for setting the desired aperture time. An energy source to the control switch is made by circuits (not shown). In addition, a socket 16 for flash-bulbs is mounted on the wall of the housing 1a. A contact spring 17 attached to the interior of wall 1a of the housing is adapted to make contact with the flashbulb socket. The contact spring 17 is in the path of movement of a radially movable contact arm 18 disposed on the ring 2. In the operation of the electromagnetic shutter control system as above described, after a magnetic field is built into the coil 9a of the electromagnet 9, the hinged or pivoted anchor 11, electromagnetically directly responsive thereto will proceed toward the coil over the air space L shown in FIG. 2. This movement causes the curvo-linear or crescent-shaped actuator arm 12 which is fixed to the anchor 11 to move in the same direction. The pin 13 at the end of the actuator arm 12 opposite to the anchor 11 engages the offset arm 2a of the ring 2 and moves it against the action of the leaf spring 6 to the position shown in dotted lines in FIG. 2, said movement being along the path S, also shown in FIG. 2. Thereby the point of engagement of the power transfer arm 12 with the offset arm 2a of the ring 2 is constantly displaced in the direction of the ideal pivot axis of the ring 2. In other words, the arm 12 is moved downwardly by the tangential stress with the constant drag power of the air gap L starting from the electromagnet 9 and conducted directly over the power transfer arm to the ring 2. As a consequence the angle path of movement of the ring has a constant and steady increase co-related to the angle path of the anchor over the air gap L.

When the arm 2a on the ring 2 reaches the position shown in dotted lines in FIG. 2 which is identical to the position wherein the shutters are completely open, the anchor 11 is set and maintained in position for the required exposure time by a control switch 19 on the core of the electromagnet 9. After the lapse of the desired time interval when the switch is connected, there is a reduction of the magnetic field in the electromagnet 9 and under the influence of the action of the return leaf spring 6 the arm 2a and consequently the ring 2 is returned to the initial position defined by contact with the stationary pin 8 as shown in solid lines in FIG. 2. In this position the segments or blades 3 return to closed position and the actuator arm 12 and anchor 11 are returned to the initial position shown in solid lines in FIGS. 1 and 2.

Thus according to the present invention a simple inexpensive and small electromagnetically controlled shutter arrangement can be utilized in cameras presently used in standard amateur and professional photography. No complex mechanism in the form of linkage or other arrangements are required which would normally make the size of the camera relatively enormous. As a consequence the present invention has provided an electromagnetically controlled shutter for a camera with relatively few operating parts to be used in conventional camera size and dimensions.

While the invention has been described in specific detail, it is to be understood that this does not limit the invention and that variations and modifications may be made by those skilled in the art within the scope of the appended claims.

What is claimed is:

1. An electromagnetically operated shutter apparatus for a camera which comprises shutter blade actuating means drivable from a closed shutter position at which the shutter blades are closed to an open shutter position at which the shutter blades are open, movement imparting electromagnetic means including an energizable stationary unitary electromagnet and an electromagnetically directly responsive unitary anchor external to the electromagnet and mounted adjacent thereto separately from and operatively independently of the shutter blade actuating means for movement from a remote position to a proximate position with respect to the electromagnet in direct response to energization of the electromagnet, and a unitary actuator arm directly operatively interconnecting the anchor with the shutter blade actuating means and movable in response to energization of the electromagnet for driving such actuating means from the closed shutter position to the open shutter position.

2. An electromagnetically operated shutter apparatus for a camera which comprises shutter blade actuating means drivable from a closed shutter position at which the shutter blades are closed to an open shutter position at which the shutter blades are open, movement imparting electromagnetic means including an energizable stationary unitary electromagnet and an electromagnetically directly responsive unitary anchor external to the electromagnet and mounted adjacent thereto separately from and operatively independently of the shutter blade actuating means for movement from a remote position to a proximate position with respect to the electromagnet in direct response to energization of the electromagnet, and a unitary actuator arm stationarily fixedly carried on the anchor for direct movement together therewith and directly operatively interconnecting the anchor with the shutter blade actuating means and movable in response to energization of the electromagnet for driving such actuating means from the closed shutter position to the open shutter position.

3. Apparatus according to claim 2 wherein return compression spring means are provided for driving the shutter blade actuating means from open shutter position back to closed shutter position upon deenergization of the electromagnet.

4. Apparatus according to claim 2 wherein the shutter blade actuating means includes a pivotally mounted unitary annular actuating ring having a radially directed stationary arm thereon operatively directly engaging the actuator arm.

5. Apparatus according to claim 4, wherein the shutter apparatus is provided with a cylindrical housing and means defining an annular space between the cylindrical housing and the annular actuating ring, and the actuator arm is in the form of a curvo-linear arm of similar curvature to that of such annular space and sized to permit unhindered movement of such actuator arm in such cylindrical housing and within such annular space for driving the annular actuating ring by impingement directly against the radially directed arm in response to energization of the electromagnet.

6. An electromagnetically operated shutter apparatus for a camera which comprises shutter blade actuating means drivable from a closed shutter position at which the shutter blades are closed to an open shutter position at which the shutter blades are open, movement imparting electromagnetic means including an energizable stationary unitary electromagnet and an electromagnetically directly responsive unitary anchor external to the electromagnet and mounted adjacent thereto for movement from a remote position to a proximate position with respect to the electromagnet in direct response to energization of the electromagnet, and a unitary actuator arm directly operatively interconnecting the anchor with the shutter blade actuating means and movable in response to energization of the electromagnet for driving such actuating means from the closed shutter position to the open shutter position, wherein the shutter blade actuating means is pivotally mounted for movement from the closed shutter position to the open shutter position and is provided with a stationary engagement portion thereon, the actuator arm is arranged for acting directly against the shutter blade actuating means at a displaceable point along such engagement portion, and the anchor is pivotally mounted and operatively disposed with respect to the electromagnet to provide a closable gap therebetween, whereby the point of engagement between the actuating arm and the shutter blade actuating means is constantly displaced in the direction of the ideal pivot axis of such actuating means in dependence upon the pivotal movement of the anchor to close such gap.

7. Apparatus according to claim 6 wherein return compression spring means are provided for driving the shutter blade actuating means from open shutter position back to closed shutter position upon deenergization of the electromagnet, and the shutter blade actuating means includes a pivotally mounted unitary annular actuating ring having as such engagement portion a radially directed stationary arm thereon operatively directly engaging the actuator arm under the action of the return spring means.

8. An electromagnetically operated shutter apparatus for a camera which comprises a pivotally mounted unitary annular shutter blade actuating ring having a radially directed stationary arm thereon and being drivable from a closed shutter position at which the shutter blades are closed to an open shutter position at which the shutter blades are open, a cylindrical housing, means defining an annular space between the cylindrical housing and the annular actuating ring, movement imparting electromagnetic means disposed in such annular space and including an energizable stationary unitary electromagnet and an electromagnetically directly responsive unitary anchor external to and operatively spaced from the electromagnet and pivotally mounted adjacent thereto for movement from a relatively remote position to a proximate position with respect to the electromagnet in direct response to energization of the electromagnet and thereby operatively disposed to provide a closable gap therebetween.

a curvo-linear unitary actuator arm fixedly carried on the anchor for direct movement together therewith and arranged in such annular space for acting directly against the radially directed arm at a displaceable point therealong, said actuator arm being of similar curvature to that of such annular space and sized to permit unhindered movement thereof in such cylindrical housing and within such annular space for directly driving the annular actuating ring from the closed shutter position to the open shutter position by impingement directly against the radially directed arm in response to energization of the electromagnet, whereby the point of engagement between the actuating arm and the radially directed arm is constantly displaced in the direction of the ideal pivot axis of the annular actuating ring in dependence upon the pivotal movement of the anchor to close such gap, and return compression spring means operatively disposed for driving the annular actuating ring from open shutter position back to closed shutter position upon deenergization of the electromagnet.

* * * * *